United States Patent
Abadie et al.

(10) Patent No.: US 12,309,279 B2
(45) Date of Patent: May 20, 2025

(54) METHOD FOR INSTALLING A COMPUTING COMPONENT AND ASSOCIATED ELECTRONIC DEVICE

(71) Applicants: RENAULT s.a.s., Boulogne-Billancourt (FR); NISSAN MOTOR CO., LTD., Yokohama (JP)

(72) Inventors: Eric Abadie, Boulogne-Billancourt (FR); Sebastien Bessiere, Tournefeuille (FR); Pascal Menier, St Gaudens (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 540 days.

(21) Appl. No.: 17/610,888

(22) PCT Filed: Apr. 15, 2020

(86) PCT No.: PCT/EP2020/060506
§ 371 (c)(1),
(2) Date: May 16, 2022

(87) PCT Pub. No.: WO2020/229074
PCT Pub. Date: Nov. 19, 2020

(65) Prior Publication Data
US 2022/0303139 A1   Sep. 22, 2022

(30) Foreign Application Priority Data
May 16, 2019   (FR) ...................................... 1905119

(51) Int. Cl.
*H04L 9/32*   (2006.01)

(52) U.S. Cl.
CPC .......... *H04L 9/3236* (2013.01); *H04L 9/3247* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 2013/0111212 A1* | 5/2013 | Baltes | ..................... | G06F 21/64 713/176 |
| 2016/0013934 A1* | 1/2016 | Smereka | ................... | H04L 9/32 713/171 |
| 2017/0060559 A1* | 3/2017 | Ye | ............................ | G06F 8/65 |

OTHER PUBLICATIONS

Dennis K. Nilsson, "Secure Firmware Updates over the Air in Intelligent Vehicles", 2008, Department of Computer Science and Engineering Chalmers University of Technology. pp. 380-384 (Year: 2008).*

(Continued)

*Primary Examiner* — Joseph P Hirl
*Assistant Examiner* — Hassan Saadoun
(74) *Attorney, Agent, or Firm* — Oblon, McClelland, Maier & Neustadt, L.L.P.

(57) ABSTRACT

A method for installing a computing component in an electronic device fitted in a vehicle, comprising the steps consisting of: receiving a device packet comprising a manifest including a hash value of the computing component; checking the integrity of the manifest; receiving the computing component; checking the correlation between the hash value of the computing component and the computing component received; installing the computing component only in the case of a positive check of the integrity of the manifest and a positive check of the correlation. An associated electronic device is also described.

14 Claims, 3 Drawing Sheets

(56) References Cited

OTHER PUBLICATIONS

International Search Report and Written Opinion issued May 7, 2020 in PCT/EP2020/060506, 12 pages.
Nilsson, D.K., et al., "Secure Firmware Updates over the Air in Intelligent Vehicles", Communications Workshop, 2008, ICC Workshops '08, IEEE International Conference on, IEEE, May 19, 2008, XP031265266, pp. 380-384.

* cited by examiner

METHOD FOR INSTALLING A COMPUTING COMPONENT AND ASSOCIATED ELECTRONIC DEVICE

CROSS-REFERENCE TO RELATED APPLICATIONS

The present application claims priority to FR1905119 filed on May 16, 2019.

TECHNICAL FIELD OF THE INVENTION

The present invention generally relates to the installation of data-processing components within vehicles, in particular motor vehicles.

It is used in a particularly advantageous manner in the context of downloading such a data-processing component within a vehicle but is also used when the data-processing component is locally loaded in the vehicle, for example, from a memory card.

It relates more specifically to a method for installing a data-processing component and an associated electronic equipment item.

PRIOR ART

In some situations, it is desirable to install a data-processing component in an electronic equipment item with which a vehicle is provided. This is particularly the case when it is desirable to update software which is implemented within the electronic equipment item or data which are manipulated by the electronic equipment item.

Such a data-processing component installation naturally has consequences relating to the subsequent operation of the vehicle and has to be carried out in a controlled manner.

STATEMENT OF INVENTION

In this context, the present invention proposes a method for installing a data-processing component in an electronic equipment item with which a vehicle is provided, comprising steps involving:
  receiving a device packet comprising a first manifest which includes a hash value of the data-processing component;
  verifying the integrity of the first manifest;
  receiving the data-processing component;
  verifying the correspondence between the hash value of the data-processing component and the data-processing component received;
  installing the data-processing component only in the case of positive verification of the integrity of the first manifest and positive verification of the correspondence.

In this manner, as a result of the invention, the vehicle receives a data structure which is associated with the data-processing component and which is involved (using in particular the hash value) in the verification of the integrity of the data-processing component. The solution proposed further makes it possible to separately transmit the device packet and the data-processing component itself, which provides greater flexibility during the design of the vehicle and the electronic equipment items thereof.

It is further possible to make provision for the first manifest mentioned above to include a first vehicle identifier and for the installation method to then comprise steps involving:
  comparing the first vehicle identifier with a second vehicle identifier stored within the vehicle;
  installing the data-processing component only in the case of a positive comparison of the first identifier and the second identifier.

Other advantageous and non-limiting features of the method according to the invention, taken individually or in accordance with all technically possible combinations, are as follows:
  the device packet comprises a first signature;
  the integrity of the manifest is verified by applying a cryptographic signature verification algorithm to the first signature and to the first manifest;
  the data-processing component is received independently of the device packet;
  the data-processing component is received within the device packet;
  the data-processing component comprises a second signature and a content;
  the method comprises a step of verifying the integrity of the content using the second signature.

The method may further comprise steps involving:
  receiving a container comprising the device packet and a second manifest;
  verifying the integrity of the second manifest.

This second manifest may thus comprise a first vehicle identifier and the installation method may in this case comprise steps which involve:
  comparing the first vehicle identifier with a second vehicle identifier stored within the vehicle;
  transmitting the device packet only in the case of positive comparison of the first identifier and the second identifier.

The container may thus, for example, comprise another device packet which is intended for another electronic equipment item.

This container may further be received from a remote server (for example, directly via a communication which is established between the remote server and the vehicle, this communication being able to partially use a radio link between the vehicle and a cellular telephone network) in response to a request transmitted by the vehicle; in a variant, the container may be received from a memory card inserted in a reader with which the vehicle is provided.

The invention finally relates to an electronic equipment item with which a vehicle is intended to be provided and which comprises:
  a module for receiving a device packet comprising a manifest including a hash value of a data-processing component;
  a module for verifying the integrity of the manifest;
  a module for receiving the data-processing component;
  a module for verifying the correspondence between the hash value of the data-processing component and the data-processing component received;
  an installation module which is configured to install the data-processing component only in the case of positive verification of the integrity of the manifest and positive verification of the correspondence.

It is possible to further make provision for the manifest to include a first vehicle identifier, and the electronic equipment item may thus comprise a module for comparing the first vehicle identifier and a second identifier of the vehicle stored within the vehicle.

The installation module may be configured to install the data-processing component only in the event of positive verification of the integrity of the manifest, positive comparison of the first identifier and the second identifier and positive verification of the correspondence.

Beyond the protection of integrity and authenticity which the verification of the manifest brings, the use of the vehicle identifier targeted therein enables legitimacy protection to be added. This is because the on-board process of updating can certainly verify that an image received is uncorrupted, authentic and compatible on a specific piece of hardware, but this does not necessarily imply that the vehicle may rightfully receive it. In the event of a cyber-attack or a malicious process in the end-to-end transmission chain, an image of a compatible vehicle could be inserted in place of the source image. The vehicle identifier in the manifest will therefore allow any occurrence of deceit to be prevented in this scenario.

Such an electronic equipment item is, for example, an electronic control unit (or computer) comprising a processor and a memory which stores computer program instructions which can be executed by the processor.

The above-mentioned modules are, for example, implemented in this instance by the cooperation of the processor and specific instructions which are configured to implement the functionality attributed to the module in question (as described below) when these instructions are carried out by the processor.

Of course, the various features, variants and embodiments of the invention may be associated with each other in accordance with various combinations in so far as they are not incompatible or mutually exclusive.

DETAILED DESCRIPTION OF THE INVENTION

The description which is given below with reference to the appended drawings, which are given by way of non-limiting example, will afford a good understanding of what the invention involves and how it can be implemented.

In the appended drawings:

FIG. 1 schematically shows a system in which the invention can be implemented;

Figure 1:
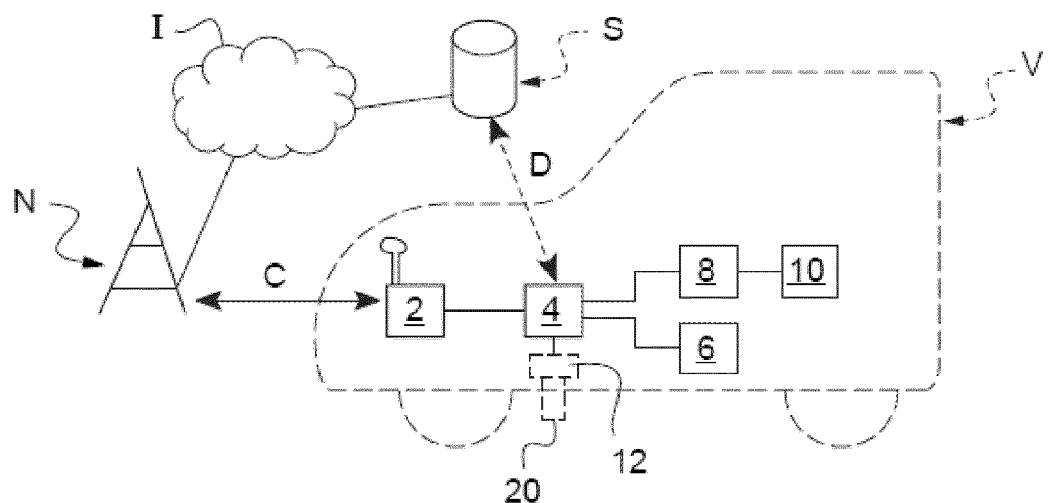

The system of FIG. 1 comprises a vehicle V (for example, a motor vehicle), a mobile telephone network N, a wide-area network I (such as the Internet) and a remote server S.

The vehicle V comprises a communication unit 2, a processing unit 4, a first electronic control unit 6, a gateway 8 and a second electronic control unit 10.

FIG. 1 shows the elements of the vehicle V which are advantageous for the understanding of the invention, but the vehicle V naturally comprises in practice other elements, in particular other electronic control units or processors.

The electronic equipment items mentioned above (communication unit 2, processing unit 4, first electronic control unit 6, gateway 8 and second electronic control unit 10) may each be produced in practice in the form of a microprocessor architecture; particularly in this context, each of these electronic equipment items comprises a processor and at least one memory (for example, a RAM and/or a non-volatile memory).

The processing unit 4 may itself be implemented in practice using an electronic control unit, where applicable having functionalities other than those described below.

As illustrated schematically in FIG. 1, the processing unit 4 is connected to the communication unit 2, to the first electronic control unit 6 and to the gateway 8 in order to be able to exchange data with these different electronic equipment items. The communication unit 2, the processing unit 4, the electronic control unit 6 and the gateway 8 are, for example, to this end connected to a (the same) on-board data-processing network (not illustrated), for example, a CAN bus ("Controller Area Network").

The gateway 8 is further connected to the second electronic control unit 10, for example, by means of a dedicated bus.

The vehicle V may further comprise a reader 12 for a memory card 20 which can be used in a construction variant of the invention, as mentioned below.

The communication unit 2 is configured to implement a communication C (as illustrated schematically in FIG. 1 by an unbroken line which signifies that this connection is of the physical type, for example, 3G/4G, Wi-Fi or the like) in the mobile telephone network N and can thus establish a connection with the remote serve S via the mobile telephone network N (by using in particular a radio link between the vehicle V and a cellular telephone network which is part of the mobile telephone network N) and the wide-area network I, so that the processing unit 4 and the remote server S can exchange data D (as illustrated schematically in FIG. 1 by a dotted line which signifies that this connection is of the logical type), in particular in the context of installation of data-processing components within the vehicle V, as described below.

Figure 2:
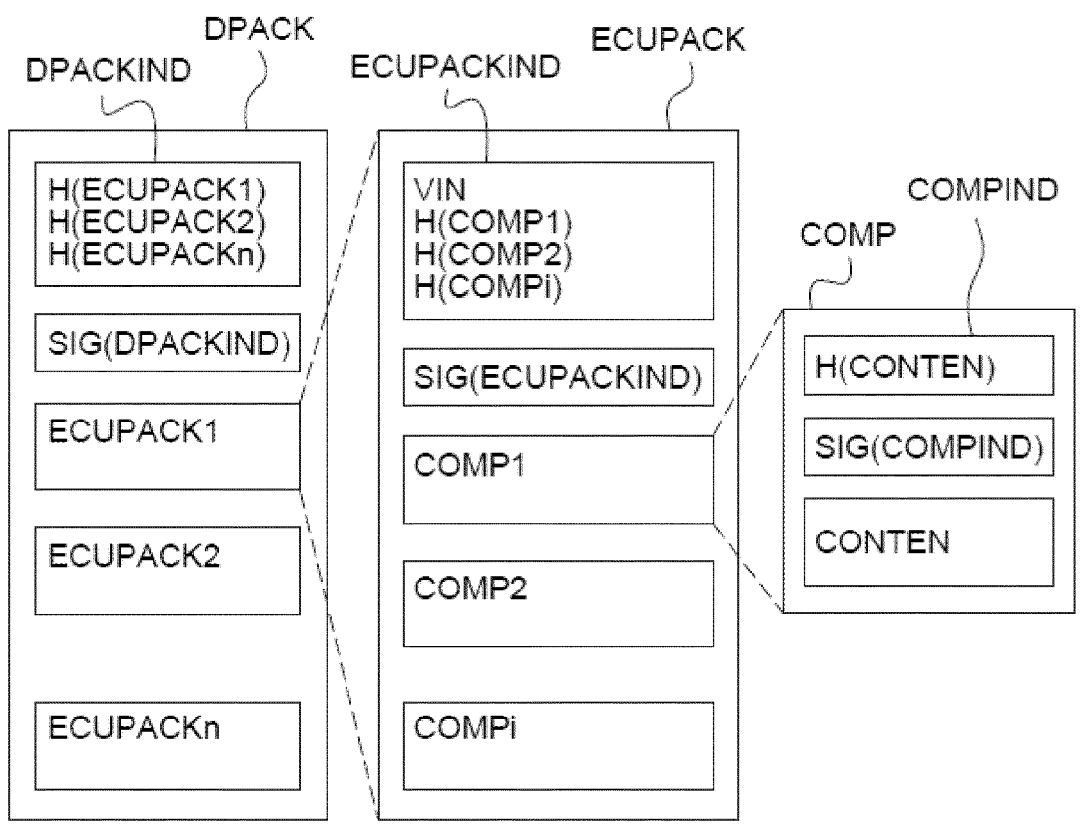
FIG. 2 shows an example of data organisation which can be used in the context of the invention.

FIG. 2 shows an example of data organisation which can be used in the context of the invention.

These data comprise in particular data-processing components COMP1, COMP2, COMPi which it is desirable to install in one or more electronic equipment item(s) of the vehicle V, in this instance in particular in the first electronic control unit 6 and/or in the second electronic control unit 10, each one being referred to using the term "electronic equipment item".

The data-processing components COMP1, COMP2, COMPi are in this instance encapsulated within a tree-and-branch structure as follows:
- a download packet DPACK comprises one or more device packet(s) ECUPACK1, ECUPACK2, ECUPACKn which each relate(s) to an electronic equipment item of the vehicle V;
- each device packet ECUPACK comprises data relating to one or more data-processing component(s) COMP1, COMP2, COMPi which is/are intended for a specific electronic equipment item.

This encapsulation method of the Russian doll type is particularly advantageous since in addition to the fact that it enables segregation of content by target component, that is to say, here per electronic control unit 2, 4, 6, 8 and 10 whose software can be modified by remote updating (or firmware over the air, FOTA), it also enables coherence of updating to be ensured within the same electronic component. Furthermore, this encapsulation enables levels of verification of integrity/authenticity with several stages to be obtained. More specifically, the communication unit 2 will be able to carry out a verification of the first level in the download packet DPACK and, as soon as this verification is validated, the device packet(s) ECUPACK will be extracted and distributed to the target components 2, 4, 6, 8 and 10. The target components 2, 4, 6, 8 and 10 will therefore be able to carry out a level 2 verification, with different cryptographic hardware, which enables a content isolation per component to be generated (of which there may be many providers). After the device packet(s) ECUPACK have been authenticated, the data-processing components COMP1, COMP2, COMPi may be extracted, validated in turn by a third cryptographic level and ultimately be installed in the event of a positive verification. This process is therefore particularly advantageous if the target processor is the communication unit 2 since, for this unit, which is often composed of a secure or protected zone (or trusted zone) and a non-secure zone (or untrusted zone), the method thus enables, as a remote processor, a verification to be carried out on 2 levels: the download packet DPACK is verified in the untrusted connected zone, the device packet ECUPACK is extracted and shared with the trusted zone, and the verification thereof will be carried out in the trusted zone. In this manner, ultimately, whether the target ECU is local or remote (other ECU of the vehicle network), the method enables verification on several levels. In the alternative which is also illustrated in FIG. 2, where a component COMP is not in the device packet ECUPACK, it will be received by means of a secondary exchange process and validated by the hash value H(COMP1), H(COMP2), H(COMPi) contained in the first instance in the device packet ECUPACK. The encapsulation of the updating content in a component enables a constructor level electronic signature to be controlled in order to ensure the certification of the images in order to ensure control of the deployment. This signature operation of the components will be carried out, for example, manually, by a certified security agent (with specific privileges) at the premises of the vehicle manufacturer. Without this operation, an uncorrupted content cannot be deployed on a vehicle. This signature level is, for example, manual (in particular ASSIM signing) and enables the deployment authorisations to be controlled. In this manner, an uncorrupted and authentic binary updating content provided by a supplier will not be able to be consumed by a processor 2, 4, 6, 8 or 10 without this verification level which enables it to be ensured that only the images certified by the vehicle manufacturer can be transmitted to the vehicle. This further enables the quality of the target software to be ensured before deployment.

Each of these packets contains a digital signature which is used with a view to the installation of the data-processing components, as described below. The verification of the digital signatures, as envisaged below, requires a specific cryptographic infrastructure which will be described here.

In order to simplify the presentation, any digital signature will be referred to below simply as a "signature".

The following are used in particular below:
- a root certificate ROOT.cert containing metadata ROOT.md and a public key ROOT.Kpub associated with a private key ROOT.Kpriv;
- a certificate of authority CA.cert containing metadata CA.md, a public key CA.Kpub and a signature CA.sig;
- a manufacturer certificate R.cert which contains metadata R.md, a public key R.Kpub and a signature R.sig;
- a public key BK.Kpub associated with a private key BK.Kpriv.

A private key CA.Kpriv is associated with the public key CA.Kpub.

In the same manner, a private key R.Kpriv is associated with the public key R.Kpub.

The term associated public key and private key is intended to be understood in this instance to refer to a public key and a private key which are associated in a "Public Key Infrastructure" (or PKI).

In such a context, a group of data may be signed by applying, to this group of data, a cryptographic signature algorithm (in this instance, of the RSA type) using the private key; the signature can then be verified using an associated cryptographic signature verification algorithm (in this instance, also of the RSA type), using the public key associated with the above-mentioned private key.

The signature CA.sig of the authority certificate CA.cert is obtained by applying a cryptographic signature algorithm using the private key ROOT.Kpriv to the group formed by the metadata CA.md and the public key CA.Kpub (this operation being carried out, for example, by a certification authority).

The signature R.sig of the manufacturer certificate R.cert is itself obtained by applying a cryptographic signature algorithm using the private key CA.Kpriv to the group formed by the metadata R.md and the public key R.Kpub (this operation also being able to be carried out by the above-mentioned certification authority).

The various data structures illustrated in FIG. 2 will now be described in detail.

Each data-processing component COMP to be installed comprises:
- a content CONTEN comprising the data to be installed (in practice to be stored) in the electronic equipment item in question;
- a manifest COMPIND, containing in particular a hash value H(CONTEN) of the content to be installed and where applicable a descriptive of the data-processing component, for example, a descriptive of the functions updated by this component;
- a signature SIG(COMPIND) of the manifest COMPIND.

These data to be installed may constitute a software item or a software item component (for example, a software update). This software item or software item component is thus configured to be executed at least partially by a processor of the electronic equipment item in question. In a variant, these data to be installed may be data to be stored (for example, map data) for subsequent manipulation by a processor of the electronic equipment item in question.

The hash value H(CONTEN) is obtained by applying a hash value function (for example, of the type SHA-256) to the content CONTEN.

The signature SIG(COMPIND) is obtained by applying to the manifest COMIND a cryptographic signature algorithm using the private key BK.Kpriv.

These operations are, for example, carried out by a certification body of the content CONTEN (for example, of the software) in question.

Each device packet ECUPACK comprises in this instance:
- one or more data-processing component(s) COMP1, COMP2, COMPi as described above;
- a manifest ECUPACKIND comprising a hash value H(COMP1), H(COMP2), H(COMPi) for each of the data-processing components COMP1, COMP2, COMPi contained in the device packet ECUPACK, and where applicable a vehicle identifier VIN and/or a descriptive of the data-processing components COMP1, COMP2, COMPi contained in the packet;
- a signature SIG(ECUPACKIND) of the manifest ECUPACKIND.

Several variants for providing the identifier VIN may be implemented. The inclusion of the identifier VIN in the device packet ECUPACK, as mentioned above, enables it to be ensured that the data-processing component installed in the electronic equipment item (for example, a processor of the vehicle) really is the component attributed to this vehicle. This is because one component could very well be suitable for a large number of vehicles of the same type, offering the possibility for the user, for example, to replace a processor of his/her vehicle with a processor of another vehicle of the same type. The inclusion of the VIN identifier in the device packet ECUPACK enables this manipulation to be avoided.

In a variant, however, it is nonetheless possible to authorise this manipulation, for example, by placing the vehicle identifier VIN within the manifest DPACKIND described below, as is the case in the variant illustrated in FIG. 3. In this case, it is possible to envisage transmitting (using the processing unit 4) the device packet ECUPACK to the electronic equipment item in question only in the case of a positive comparison between the identifier VIN received within the manifest DPACKIND and the identifier of the vehicle V as stored (in this instance, within the processing unit 4).

According to other embodiments which may be envisaged, the identifier VIN may be placed both in the manifest DPACKIND and in the manifest ECUPACKIND, or in neither of these two manifests, in particular for a data-processing component which is compatible with any vehicle, such as, for example, a data-processing component comprising map data of a navigation system.

In this instance, the identifier VIN of the vehicle V is a number associated uniquely with a vehicle, generally referred as the VIN "Vehicle Identification Number".

The hash values H(COMP1), H(COMP2), H(COMPi) are obtained by applying a hash function (for example, of the type SHA-256) to the data which constitute the data-processing component COMP1, COMP2, COMPi in question, respectively, for example, during the definition of the device packet ECUPACK (in accordance with the requirements of the equipment item in question, in particular the updating requirements of this equipment item).

The signature SIG(ECUPACKIND) is obtained by applying to the manifest ECUPACKIND a cryptographic signature algorithm which uses the private key R.Kpriv (associated with the manufacturer certificate R.cert).

These operations are, for example, carried out by the vehicle manufacturer (or on behalf of the vehicle manufacturer) when the data-processing components to be installed are defined for the electronic equipment item in question in a specific vehicle (identified using the identifier VIN.

In practice, the signature SIG(ECUPACKIND) is, for example, contained in a field dedicated to the device packet ECUPACK, for example, a field in the cms format ("Cryptographic Message Syntax"). In this case, this field may comprise the signature SIG(ECUPACKIND), the authority certificate CA.cert and the manufacturer certificate R.cert.

The download packet DPACK comprises:
one or more device packet(s) ECUPACK1, ECUPACK2, ECUPACKn as described above;
a manifest DPACKIND comprising in particular a hash value H(ECUPACK1), H(ECUPACK2), H(ECUPACKn) for each of the device packets ECUPACK1, ECUPACK2, ECUPACKn contained in the download packet DPACK, and where applicable a descriptive of the device packets ECUPACK1, ECUPACK2, ECUPACKn contained in the download packet DPACK (with, for example, an indication, for each device packet ECUPACK1, ECUPACK2, ECUPACKn of the target electronic equipment item of the device packet in question);
a signature SIG(DPACKIND) of the manifest DPACKIND.

The hash values H(ECUPACK1), H(ECUPACK2), H(ECUPACKn) are obtained by applying a hash function (for example, of the type SHA-256) to the device packet ECUPACK2, ECUPACK2, ECUPACKn in question, respectively, for example, during the definition of the download packet DPACK (after definition of the target electronic equipment items and the respective needs of each of the equipment items).

The signature SIG(DPACKIND) is obtained by applying to the manifest DPACKIND a cryptographic signature algorithm which uses the private key R.Kpriv (associated with the manufacturer certificate R.cert).

These operations are, for example, carried out by the vehicle manufacturer (or on behalf of the vehicle manufacturer) when the electronic equipment items in question and the data-processing components to be installed in these electronic equipment items are defined.

In practice, the signature SIG(DPACKIND) is, for example, contained in a dedicated field of the download packet DPACK, for example, a field in the cms format ("Cryptographic Message Syntax"). In this case, this field may comprise the signature SIG(DPACKIND), the authority certificate CA.cert and the manufacturer certificate R.cert.

It should be noted that, in the architecture which has been described above, each of the data-processing components COMP1, COMP2, COMPi is independent of the vehicle V targeted by the installation (and may, for example, be used for a fleet of vehicles). The device packets ECUPACK1, ECUPACK2, ECUPACKn (and consequently the download packet DPACK) are, however, specifically configured for the vehicle V.

Figure 3:
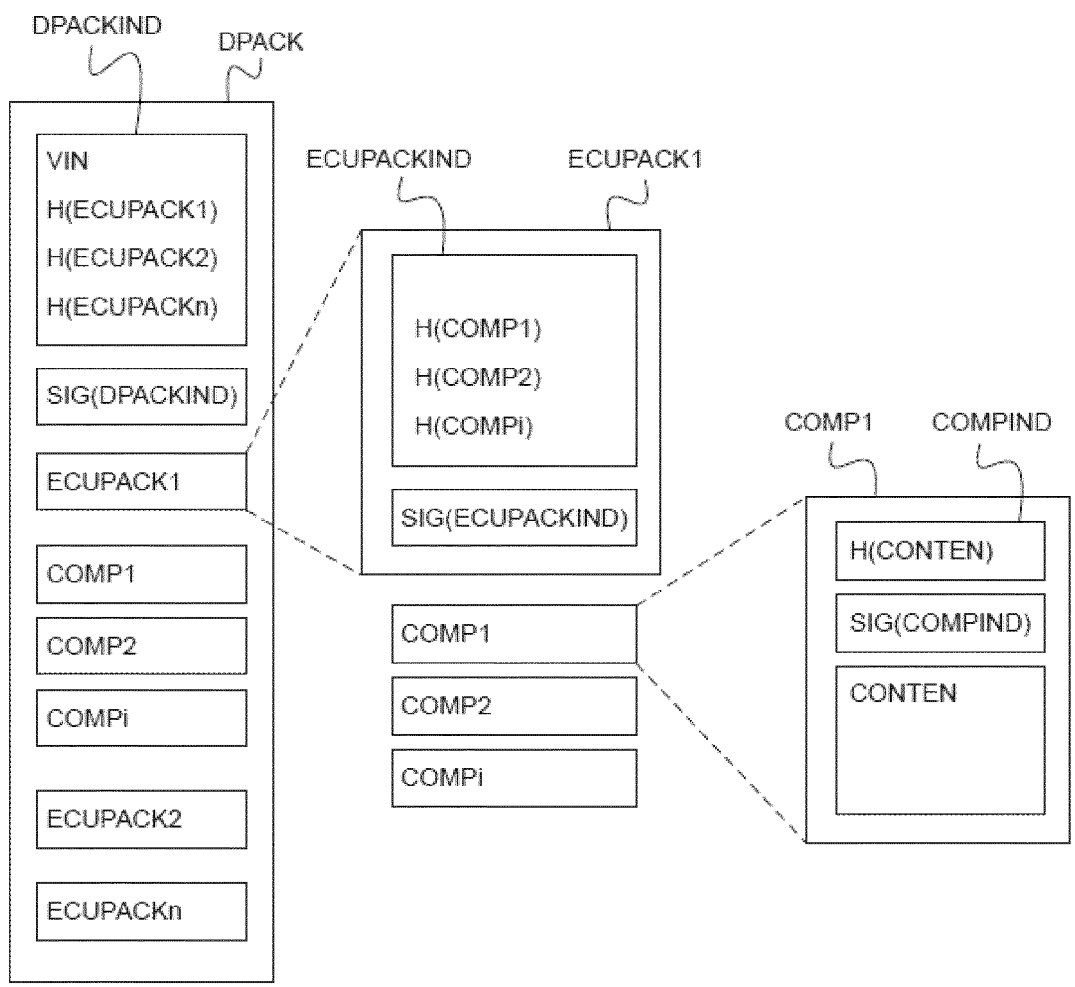
FIG. 3 shows another example of data organisation which can be used in the context of the invention.

FIG. 3 has a variant which may be envisaged for the organisation of the data within the download packet DPACK.

As already indicated, in this variant, the vehicle identifier VIN is placed within the manifest DPACKIND.

Furthermore, the data-processing components COMP1, COMP2, COMPi relating to a specific electronic equipment item are not included in the device packet ECUPACK1 which is intended for this electronic equipment item, but are instead external relative thereto in order to be able where applicable to be transmitted separately from the device packet ECUPACK1 as explained below.

The device packet ECUPACK1 comprises in this instance:
a manifest ECUPACKIND comprising a hash value H(COMP1), H(COMP2), H(COMPi) for each of the data-processing components COMP1, COMP2, COMPi associated with the electronic equipment item in question;
a signature SIG(ECUPACKIND) of the manifest ECUPACKIND.

Figure 4:
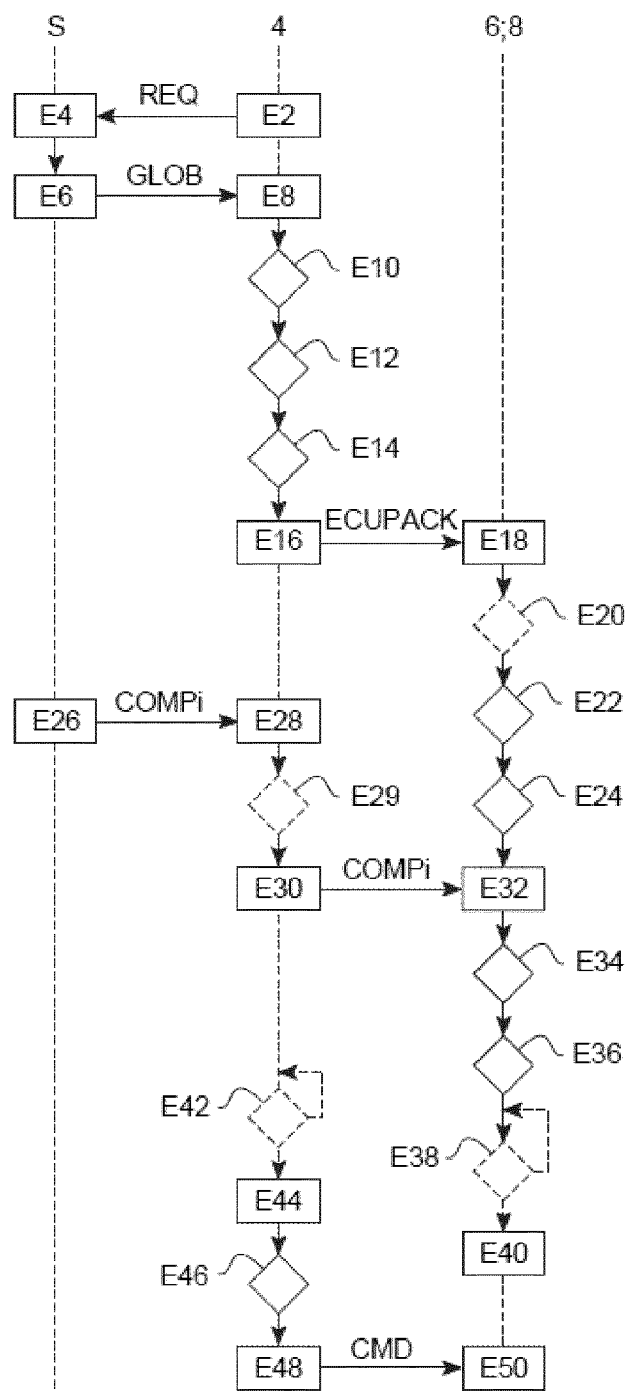
FIG. 4 shows an example of a method for installing data-processing components within a vehicle according to the invention.

An example of a method for installing data-processing components within the vehicle V in accordance with the invention will now be described with reference to FIG. 4.

This method begins at step E2 during which the processing unit 4 transmits a request REQ intended for the remote server S. With this request, the vehicle V seeks to determine whether data-processing components are available for installation within the vehicle V, for example, for updating specific software components or specific data (such as map data).

The request REQ is, for example, transmitted periodically by the processing unit 4. In practice, electronic coordinates of the remote server S are, for example, stored within the processing unit 4 and used to transmit the request REQ intended for the remote server S. The electronic coordinates preferably refer to a secure connection such as an SSL (Secure Sockets Layer).

The request REQ may include the identifier VIN of the vehicle V.

The remote server S receives the request REQ in step E4 and determines (for example, based on the identifier VIN included in the request REQ) whether data-processing components are available for download for the vehicle V.

It is assumed in this instance that data-processing components are available for download and installation in the vehicle V. The server consequently transmits in step E6 a global container GLOB to the processing unit 4.

This global container GLOB comprises the manifest DPACKIND, the associated signature SIG(DPACKIND) and the device packets ECUPACK1, ECUPACK2, ECU-PACKn. Consequently, according to the embodiments, this global container GLOB does or does not comprise the data-processing components COMP1, COMP2, COMPi.

This is because, in accordance with a first embodiment, it is also possible to transmit in this step E6 all or some of the data-processing components COMP1, COMP2, COMPi (these components transmitted in step E6 thus not being transmitted in step E26 described below). These data-processing components may thus be transmitted either within the device packets ECUPACK (for example, within the framework of the data structure illustrated in FIG. 2), or alongside the device packet ECUPACK1 in question (for example, within the framework of the data structure illustrated in FIG. 3).

According to a second embodiment, the global container GLOB transmitted at step E6 does not contain any of the data-processing components COMP1, COMP2, COMPi (these data-processing components thus being transmitted during one or more step(s) in accordance with step E26 described below).

The processing unit 4 receives the global container GLOB in step E8 and can thus store it. The global container GLOB is in this instance received directly via the communication established between the remote server S and the vehicle V, this communication partially using in this instance a radio link between the vehicle V and the cellular telephone network already mentioned.

In a variant, the global container GLOB (with or without data-processing components) could be received in step E8 from a memory card 20 which is inserted in the reader 12 (and which is thereby connected to the processing unit 4) as indicated above. Steps E2 to E6 are not implemented in this case.

It should be noted that, in the embodiments where the global container GLOB transmitted does not contain the data-processing components COMP1, COMP2, COMPi (or at least some of them), the memory size required within the processing unit 4 in order to store the global container GLOB received may be reduced. In other words, it is not necessary to provide within the processing unit 4 a buffer memory which is suitable for storing all of the download packet DPACK.

The processing unit 4 thus carries out in step E10 the verification of the manufacturer certificate R.cert which contains in particular the public key R.Kpub used subsequently in order to verify signatures).

As indicated above, the certificate R.cert is in this instance contained in a field of the cms format of the download packet DPACK (and therefore of the global container GLOB received in step E8).

In order to verify the manufacturer certificate R.cert, a cryptographic signature verification algorithm using the public key CA.Kpub is applied to the signature R.sig and to the signed data (in this instance, the metadata R.md and the public key R.Kpub). (It should be noted that the public key CA.Kpub is part of the certificate CA.cert which is itself contained in the field with the format CMS mentioned above.) In practice, a hash value of the signed data and the result obtained by applying to the signature R.sig a cryptographic algorithm (in this instance, of the RSA type) using the public key CA.Kpub are, for example, compared.

In the absence of verification (that is to say, in the event of inequality during the step of comparing the above-mentioned hash value and the above-mentioned result), the installation process is ended, where applicable with an error message being sent to the remote server S.

In the event of positive verification in step E10 (that is to say, in the case of equality in the step of comparing the above-mentioned hash value and the above-mentioned result), the processing unit can verify whether the certificate R.cert has not expired by comparing the date and the time at the time involved with the expiration dates and times mentioned in the metadata R.md.

If the certificate has expired, the installation process is ended, where applicable with an error message being sent to the remote server S.

If the certificate is valid, the processing unit 4 carries out in step E12 the verification of the authority certificate CA.cert (which contains in particular the public key CA.Kpub used as described above).

As indicated above, the certificate CA.cert is contained in this instance in a field with the cms format of the download packet DPACK (and therefore of the global container GLOB received in step E8).

In order to verify the authority certificate CA.cert, a cryptographic signature verification algorithm using the public key ROOT.Kpub is applied to the signature CA.sig and to the signed data (in this instance, the metadata CA.md and the public key CA.Kpub). In practice, for example, a hash value of the signed data and the result obtained by applying to the signature CA.sig a cryptographic algorithm (in this instance, of the RSA type) using the public key ROOT.KPub are compared.

The public key ROOT.Kpub is, for example, stored (during the production of the processing unit 4) within a non-volatile memory of the processing unit 4.

In the absence of verification (that is to say, in the case of inequality during the step of comparing the above-mentioned hash value and the above-mentioned result), the installation process is ended, where applicable with an error message being sent to the remote server S.

In the event of positive verification in step E12, (that is to say, in the case of equality in the step of comparing the above-mentioned hash value and the above-mentioned result), the processing unit can verify whether the certificate CA.cert has not expired by comparing the date and the time at the time involved with the expiration dates and times mentioned in the metadata CA.md.

If the certificate has expired, the installation process is ended, where applicable with an error message being sent to the remote server S.

If the certificate is valid, it is possible to verify in the same manner the validity of the root certificate ROOT.cert by comparing the date and time at the given time with the expiration dates and times of the root certificate ROOT.cert mentioned in the metadata ROOT.md.

If the certificate has expired, the installation process is ended, where applicable with an error message being sent to the remote server S.

If the certificate is valid, the processing unit 4 verifies in step E14 specific portions of the global container GLOB received in step E8.

The processing unit verifies in particular in step E14 the integrity of the manifest DPACKIND (received in the global container GLOB).

To this end, the processing unit applies a cryptographic signature verification algorithm using the public key R.Kpub to the signature SIG(DPACKIND) and to the manifest DPACKIND. In practice, for example, a hash value of the manifest DPACKIND and the result obtained by applying to the signature SIG(DPACKIND) a cryptographic algorithm (in this instance, of the RSA type) using the public key R.Kpub are compared. (It should be noted that the validity of the certificate R.cert containing the public key R.Kpub was verified in step E10.

In the absence of verification (that is to say, in the event of inequality during the step of comparing the hash value mentioned above and the result mentioned above), the installation process is ended, where applicable with an error message being sent to the remote server S.

In the event of positive verification in step E14 (that is to say, in the case of inequality during the step of comparing the above-mentioned hash value and the above-mentioned result), the installation process is continued in step E16 which will now be described.

The processing unit 4 distributes in step E16 various device packets ECUPACK to the electronic equipment items responsible for the installation of the data-processing components, in this instance, for example, the first electronic control unit 6 and/or the gateway 8.

Each device packet ECUPACK contains the data of the global container GLOB intended for a specific electronic equipment item (in this instance, the first electronic control unit 6 or gateway 8), that is to say, the data of the device packet ECUPACKn intended for this electronic equipment item, with or without the data-processing components COMP1, COMP2, COMPi themselves, depending on the embodiment in question.

As already indicated, it is in fact possible to make provision for all or some of the electronic components to be transmitted in the global container GLOB during step E6 and therefore for at least some device packets ECUPACK to comprise one or more data-processing component(s).

Each electronic equipment item in question thus receives a device packet ECUPACK in step E18. The implementation of the method for such an electronic equipment item (in this instance, the first electronic control unit 6 or gateway 8) is described below, but with similar steps being carried out in practice for the other electronic equipment items which receive a device packet ECUPACK.

The electronic equipment item (in this instance, either the first electronic control unit 6 or the gateway 8) may thus where applicable implement in step E20 a step of verification of the manufacturer certificate R.cert and the certificate of authority CA.cert. It should be noted that, in the example described in this instance, these certificates R.cert and CA.cert are part of a field of the cms type of the device packet ECUPACK.

The verifications of step E20 (carried out by the electronic equipment item 6, 8 in question) are similar to the one carried out in steps E10 and E12 described above by the processing unit 4 and will not be described in detail here.

In the absence of verification in step E20, the installation process within the equipment item 6, 8 in question is ended. An error message may further be sent to the processing unit 4 (for potential transmission to the remote server S, for example).

In the event of positive verification in step E20, the electronic equipment item 6, 8 in question carries out in step E22 verification of the integrity of the manifest ECUPACKIND (received within the device packet ECUPACKIND).

To this end, the electronic equipment item 6, 8 in question applies a cryptographic signature verification algorithm using the public key R.Kpub to the signature SIG(ECUPACKIND) and to the manifest ECUPACKIND. In practice, for example, a hash value of the manifest ECUPACKIND and the result obtained by applying to the signature SIG (ECUPACKIND) a cryptographic algorithm (in this instance, of the RSA type) using the public key R.Kpub are compared. (It should be noted that the validity of the certificate R.cert containing the public key R.Kpub was verified during the step E20).

In the absence of verification (that is to say, in the case of inequality in the step of comparing the above-mentioned hash value and the above-mentioned result), the installation process is ended at the electronic equipment item 6, 8 in question, where applicable with an error message being sent to the processing unit 4 (for potential transmission to the remote server S, for example).

In the case of positive verification in step E22 (that is to say, in the case of inequality in the step of comparing the above-mentioned hash value and the above-mentioned result), the electronic equipment item 6, 8 in question verifies in step E24 whether the identifier VIN of the vehicle V included in the manifest ECUPACKIND corresponds (that is to say, is equal in practice) to the identifier VIN of the vehicle V stored (for example, in a non-volatile memory) within the electronic equipment item 6, 8.

In the absence of verification (that is to say, in the case of inequality between the identifier VIN indicated in the manifest ECUPACKIND and the identifier stored), the installation process is ended at the electronic equipment item 6, 8 in question, where applicable with an error message being sent to the processing unit 4 (for potential transmission to the remote server S, for example).

In the case of positive verification in step E24 (that is to say, in the case of equality between the identifier VIN indicated in the manifest ECUPACKIND and the identifier stored), the installation can continue in step E32 described below (after receiving the data-processing components, as will now be described).

In parallel with the processing which has been mentioned within the electronic equipment item 6, 8 responsible for the installation, the remote server S transmits in step E26 at least one data-processing component COMPi of the download packet DPACK to the processing unit 4. Although this is not illustrated in FIG. 4, this transmission of the data-processing component COMPi may be initiated following receipt by the remote server S of an indication from the processing unit 4, this indication signalling, for example, sufficient space in the buffer memory for storing the data-processing component COMPi).

The processing unit 4 receives the data-processing component COMPi in step E28.

The processing of a single data-processing component COMPi will now be described below. In practice, several data-processing components are received, at the same time or at a later time depending on the capacities of the buffer memory of the processing unit 4 and are processed as described for the data-processing component COMPi.

When the component COMPI received in step E28 enables a device packet ECUPACKn to be supplemented (using the data of the global container GLOB), the processing unit 4 may where applicable implement in step E29 a verification of the content of the device packet ECUPACKn in question, by comparing, for example, the hash value H(ECUPACKn) contained in the manifest DPACKIND and a hash value obtained by applying the hash function (in this instance, SHA256) to the device packet ECUPACKn as received.

In the absence of verification (that is to say, if the hash value H(ECUPACKn) of the manifest DPACKIND differs from the hash value obtained on the basis of the device packet ECUPACKn received), the data-processing component COMPi is not communicated to the electronic equipment item 6, 8 in question and an error message may where applicable be sent to the remote server S.

In the case of positive verification in step E29, that is to say, in the case of equality between the hash value H(ECUPACKn) of the manifest DPACKIND and the hash value obtained on the basis of the device packet ECUPACKn received, the data-processing component COMPi is distributed to the electronic equipment item 6, 8 in question in step E30.

The electronic equipment item 6, 8 in question thus receives the data-processing component COMPi in step E32.

The electronic equipment item 6, 8 can thus verify this data-processing component COMPi.

First of all, in step E34, the electronic equipment item 6, 8 compares the hash value H(COMPi) contained in the manifest ECUPACKIND and a hash value obtained by applying the hash function (in this instance, SHA256) to the data-processing component COMPi received. (It should be noted that the integrity of the manifest ECUPACKIND was verified in step E22).

In the case of negative verification (that is to say, if the hash value H(COMPi) contained in the manifest ECUPACKIND differs from the hash value obtained), the installation of the data-processing component COMPi is ended.

In the case of positive verification in step E34 (that is to say, in the case of equality between the hash value H(COMPi) contained in the manifest ECUPACKIND and the hash value obtained), the verification of the data-processing component COMPi continues in step E36.

The electronic equipment item 6, 8 first verifies in step E36, the integrity of the manifest COMPIND of the data-processing component COMPi.

To this end, the electronic equipment item 6, 8 in question applies a cryptographic signature verification algorithm using the public key BK.Kpub to the signature SIG(COMPIND) and the manifest COMPIND. In practice, a hash value of the manifest COMPIND and the result obtained by applying the signature SIG(COMPIND) of a cryptographic algorithm (in this instance, of the RSA type) are, for example, compared using the public key BK.KPub.

The public key BK.Kpub is, for example, stored in a non-volatile memory of the electronic equipment item 6, 8 in question.

In the absence of verification (that is to say, in the case of inequality in the step of comparing the above-mentioned hash value and the above-mentioned result), the installation process of the data-processing component COMPi is ended, where applicable with an error message being sent to the processing unit 4 (for potential transmission to the remote server S, for example).

In the case of positive verification of the signature SIG (COMPIND) (that is to say, in the case of equality in the step of comparing the above-mentioned hash value and the above-mentioned result), the electronic equipment item 6, 8 compares the hash value H(CONTEN) contained in the manifest COMPIND and a hash value obtained by applying the hash function (in this instance, SHA256) to the content CONTEN of the data-processing component COMPi received.

In the absence of verification (that is to say, in the case of inequality between the hash value H(CONTEN) of the manifest COMPIND and the hash value obtained), the installation process of the data-processing component COMPi is ended, where applicable with an error message being sent to the processing unit 4 (for potential transmission to the remote server S, for example).

In the case of positive verification (that is to say, in the case of inequality between the hash value H(CONTEN) of the manifest COMPIND and the hash value obtained), the installation method continues as described here.

In the case, for example, in which the vehicle V is a vehicle with a thermal engine, it is thus possible to provide a step E38 of waiting for operation of the thermal engine (which enables it to be ensured in practice that all the electronic equipment items are operating and the data-processing component COMPi will be able to be correctly installed in the electronic equipment item in question).

When the thermal engine is operational (or without this condition for a vehicle without a thermal engine), the electronic equipment item 6, 8 in question controls the installation of the data-processing component COMPi, that is to say, storing the data-processing component COMPi in a non-volatile (rewritable) memory with a view to it being subsequently used.

In some cases (for example, for the first electronic control unit 6), the installation of the data-processing component COMPi is carried out within the electronic equipment item itself (in this instance, the first electronic control unit 6) which has carried out the previous verification steps E20 to E36 described above.

In contrast, in other cases (in this instance, for the gateway 8), the electronic equipment item (in this instance, the gateway 8) responsible for the installation and having in this context carried out the previous verification steps E20 to E36, controls the installation of the data-processing component COMPi within another electronic equipment item, in this instance the second electronic control unit 10. The gateway 8 thus controls, for example, the storage of the data-processing component COMPi in a non-volatile (rewritable) memory of the second electronic control unit 10.

There is provision in this instance for the data-processing components not to be used as soon as they are installed, but instead when other conditions are complied with, as will be described here.

When the vehicle V is a vehicle with a thermal engine, it is possible to use a step E42 of waiting for the operation of the thermal engine to stop.

When the thermal engine of the vehicle V is stopped (or the vehicle V does not use a thermal engine), the processing unit 4 displays on a user interface (for example, a screen which is arranged in the passenger compartment of the vehicle V) an indication that data-processing components have been installed and are ready to be used (step E44).

The processing unit 4 thus waits in step E46 for a response from the user (for example, the driver of the vehicle V), for example, via the above-mentioned user interface) (where applicable, the screen mentioned above when this screen is a touch screen).

In the case of a negative response of the user, the data-processing component(s) installed in step E40 is/are not used.

In the case of a positive response of the user in step E46, the processing unit 4 transmits to the various electronic equipment items in question (in this instance, the first electronic control unit 6 and, via the gateway 8, the second electronic control unit 10), a command CMD for activating the data-processing components installed (step E48).

The data-processing components installed are then activated (step E50).

For the software data-processing components, instructions included in the data-processing component in question may then be carried out by the processor of the electronic equipment item 6, 10 in which the data-processing component has been installed.

For data-processing components formed from manipulable data, data included in the data-processing component in question may be manipulated by the processor of the electronic equipment item 6, 10 in which the data-processing component has been installed.

The invention claimed is:

1. A method for installing a data-processing component in an electronic equipment item with which a vehicle is provided, comprising:
   receiving a device packet comprising a first manifest which includes a hash value of the data-processing software component;
   verifying integrity of the first manifest;
   receiving the data-processing software component;
   verifying a correspondence between the hash value of the data-processing software component and the data-processing software component received and performing a Vehicle Identification Number (VIN) comparison to verify compatibility between the data-processing software component and the vehicle; and
   installing the data-processing software component into the vehicle only in the case of positive verification of the integrity of the first manifest and positive verification of the correspondence.

2. The method as claimed in claim 1, wherein the first manifest includes a first vehicle identifier, and the method further comprises:
   comparing the first vehicle identifier with a second vehicle identifier stored within the vehicle; and
   installing the data-processing software component only in the case of a positive comparison of the first identifier and the second identifier.

3. The method as claimed in claim 1, wherein the device packet includes a first signature and wherein the integrity of the manifest is verified by applying a cryptographic signature verification algorithm to the first signature and to the first manifest.

4. The method as claimed in claim 1, wherein the data-processing software component is received independently of the device packet.

5. The method as claimed in claim 1, wherein the data-processing software component is received within the device packet.

6. The method as claimed in claim 1, further comprising:
   receiving a container comprising the device packet and a second manifest; and
   verifying the integrity of the second manifest.

7. The method as claimed in claim 6, wherein the container includes another device packet which is intended for another electronic equipment item.

8. The method as claimed in claim 6, wherein the second manifest includes a first vehicle identifier, and the method further comprises:
   comparing the first vehicle identifier with a second vehicle identifier stored within the vehicle; and
   transmitting the device packet only in the case of positive comparison of the first identifier and the second identifier.

9. The method as claimed in claim 6, wherein the container is received from a remote server in response to a request transmitted by the vehicle.

10. The method as claimed in claim 6, wherein the container is received from a memory card inserted in a reader with which the vehicle is provided.

11. The method as claimed in claim 1, wherein the data-processing software component comprises a second signature and a content, and wherein the method comprises a step of verifying the integrity of the content using the second signature.

12. An electronic equipment item with which a vehicle is intended to be provided, comprising:
    processing circuitry configured to:
    receive a device packet comprising a manifest including a hash value of a data-processing software component;
    verify an integrity of the manifest;
    receive the data-processing software component;
    verify a correspondence between the hash value of the data-processing software component and the data-processing software component received and performing a Vehicle Identification Number (VIN) comparison to verify compatibility between the data-processing software component and the vehicle; and
    install the data-processing software component in the vehicle only in the case of positive verification of the integrity of the manifest and positive verification of the correspondence.

13. The electronic equipment item as claimed in claim 12, wherein the manifest includes a first vehicle identifier, and the processing circuitry is further configured to:
    compare the first vehicle identifier and a second identifier of the vehicle stored within the vehicle, and
    install the data-processing software component only in the event of positive verification of the integrity of the manifest, positive comparison of the first identifier and the second identifier and positive verification of the correspondence.

14. A method for installing a data-processing component in an electronic equipment item with which a vehicle is provided, comprising:
    receiving a device packet comprising a first manifest which includes a hash value of the data-processing component;
    verifying integrity of the first manifest;
    receiving the data-processing component;
    verifying a correspondence between the hash value of the data-processing component and the data-processing component received;
    installing the data-processing component only in the case of positive verification of the integrity of the first manifest and positive verification of the correspondence;
    receiving a container comprising the device packet and a second manifest; and
    verifying the integrity of the second manifest.

* * * * *